United States Patent
Kubota et al.

(10) Patent No.: US 8,397,178 B2
(45) Date of Patent: Mar. 12, 2013

(54) ORDER RECEIVING APPARATUS AND ORDER RECEIVING METHOD

(75) Inventors: Takahide Kubota, Shizuoka (JP); Yumiko Okuma, Tokyo (JP); Masanori Sambe, Shizuoka (JP); Hisashi Sato, Shizuoka (JP); Takashi Makiyama, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 314 days.

(21) Appl. No.: 12/755,725

(22) Filed: Apr. 7, 2010

(65) Prior Publication Data

US 2010/0262935 A1 Oct. 14, 2010

(30) Foreign Application Priority Data

Apr. 8, 2009 (JP) ................................. 2009-094200

(51) Int. Cl.
*G06F 3/048* (2006.01)
(52) U.S. Cl. .................... 715/821; 715/822; 715/823
(58) Field of Classification Search .................. 715/798, 715/810, 704, 710, 740, 777, 788, 815, 818–823
See application file for complete search history.

(56) References Cited

U.S. PATENT DOCUMENTS

| | | | |
|---|---|---|---|
| 2006/0132821 A1* | 6/2006 | Nonaka et al. | 358/1.13 |
| 2007/0265935 A1* | 11/2007 | Woycik et al. | 705/26 |
| 2009/0167553 A1* | 7/2009 | Hong et al. | 340/825.29 |
| 2009/0259559 A1* | 10/2009 | Carroll et al. | 705/17 |

FOREIGN PATENT DOCUMENTS

| | | |
|---|---|---|
| JP | 07-175974 | 7/1995 |
| JP | 09-212747 | 8/1997 |
| JP | 10-049759 | 2/1998 |
| JP | 2003-203275 | 7/2003 |
| JP | 2007-226321 | 9/2007 |
| JP | 2007-299092 | 11/2007 |
| JP | 2008-299821 | 12/2008 |

OTHER PUBLICATIONS

Japanese Office Action for Japanese Patent Application No. 2009-094200 Mailed on Feb. 22, 2011.

* cited by examiner

*Primary Examiner* — Weilun Lo
*Assistant Examiner* — Truc Chuong
(74) *Attorney, Agent, or Firm* — Turocy & Watson, LLP

(57) ABSTRACT

An order receiving apparatus includes: a display unit configured to display an order input screen including an order list in which order information indicating ordered menu items is list-displayed; a receiving unit configured to receive the order information indicating a menu item, an order of which is to be cancelled, among the pieces of order information list-displayed in the order list; a canceling unit configured to cancel the order of the menu item indicated by the received order information; and a changing unit configured to change display of the order information indicating the menu item, the order of which is cancelled, among the pieces of order information list-displayed in the order list to special display.

10 Claims, 6 Drawing Sheets

FIG.4

| CODE 401a | SECTION 401b | ALLOCATION 401f | IMAGE 401c | MENU NAME 401d | UNIT PRICE 401e | TAKE AWAY | SERVICE CHARGE IMPOSED | KP1 TO 4 | BUTTON COLOR |
|---|---|---|---|---|---|---|---|---|---|
| 0001 | 01 | 1 | | BLENDED COFFEE | 350 | OK | ○ | | |
| 0002 | 01 | 2 | | ICED COFFEE | 350 | OK | ○ | | |
| 0003 | 01 | 3 | | WEAK COFFEE L | 350 | OK | | | |
| 0004 | 01 | 4 | | ESPRESSO | 500 | OK | ○ | | |
| 0005 | 01 | 5 | | COFFEE OF THE DAY | 300 | OK | ○ | | |
| 0006 | 01 | | | CAFÉ LA THE | 420 | OK | | | |
| 0007 | 01 | | | CAFÉ LA THE L | 460 | OK | ○ | | |
| 0008 | 01 | | | TEA WITH LEMON | 350 | OK | ○ | | |
| 0009 | 01 | | | TEA WITH MILK | 350 | OK | ○ | | |
| 0010 | 01 | | | HERB TEA | 300 | OK | | | |
| 0011 | 01 | | | OOLONG TEA | 250 | | | | |
| 0012 | 01 | | | COKE | 250 | | | | |
| 0013 | 01 | | | GINGER ALE | 250 | | | | |

401

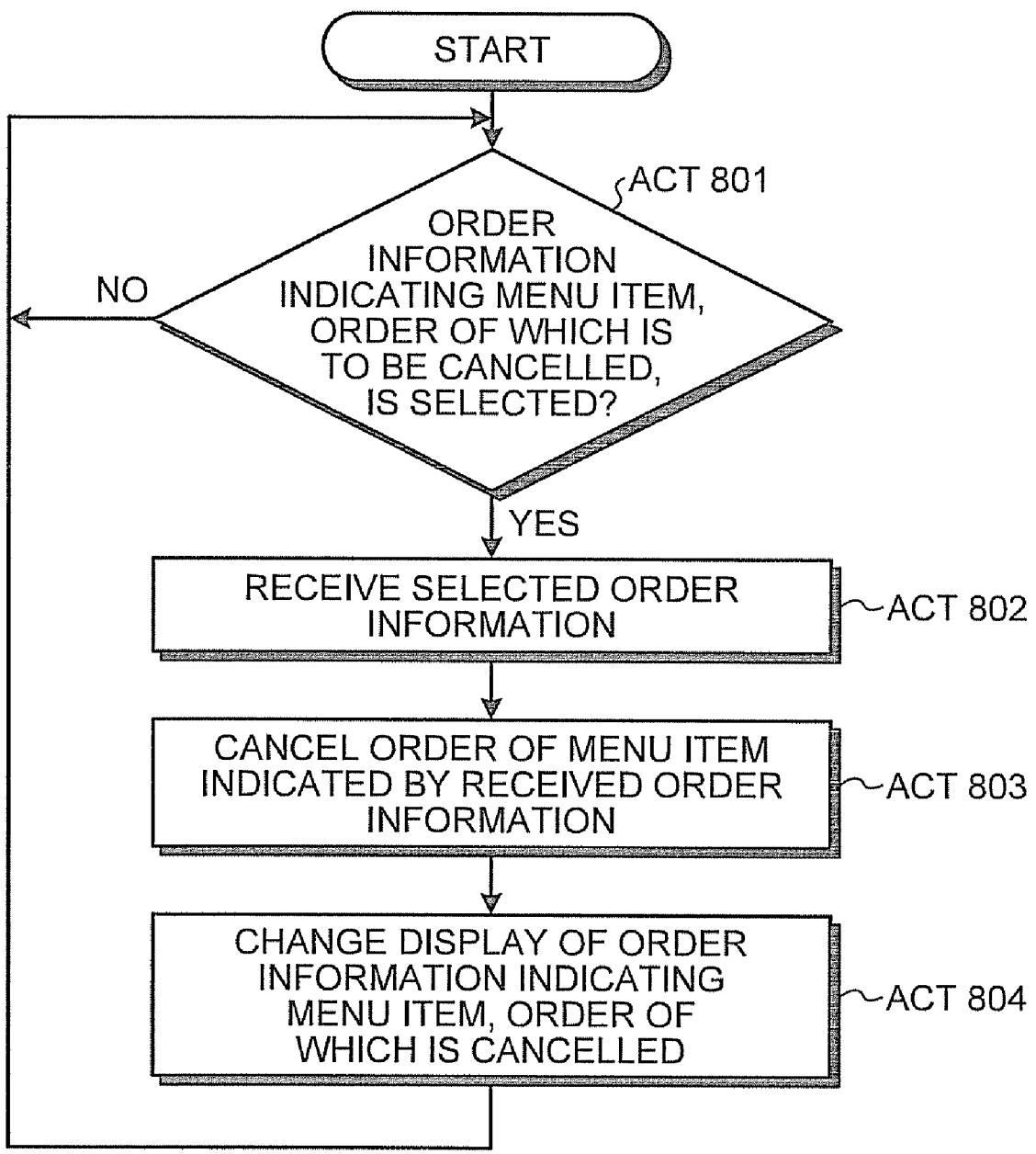

ORDER RECEIVING APPARATUS AND ORDER RECEIVING METHOD

CROSS-REFERENCE TO RELATED APPLICATION

This application claims the benefit of priority from Japanese Patent Application No. 2009-094200 filed on Apr. 8, 2009, the entire content of which is incorporated herein by reference.

TECHNICAL FIELD

The present invention relates to an order receiving apparatus set in an eating house such as a restaurant and an order receiving method for inputting guidance information for customers, order information of menus, and the like and supporting customer service jobs.

BACKGROUND

For example, in a large number of eating houses such as family restaurants and bars, an order management system that can centrally manage jobs from order taking to checkout of food and drink menus is installed (see JP-A-2008-299821). The system disclosed in JP-A-2008-299821 includes a checkout apparatus such as an electronic cash register or a point of sales (POS) terminal set in a register that is a checkout place for payment, a station configured to execute, for example, management of various kinds of information transmitted from the checkout apparatus, a slip issuing printer connected to the checkout apparatus and configured to print and issue an order slip, and a kitchen printer configured to print and output a cooking instruction slip. In the system disclosed in JP-A-2008-299821, the station, the slip issuing printer, the kitchen printer, and the checkout apparatus are connected via a communication line such as a local area network (LAN).

The checkout apparatus disclosed in JP-A-2008-299821 performs, according to touches on a menu button and a cancellation button in a menu item space in an order input screen, input of an order and cancellation of an order. An operator checks ordered menu items according to an order list displayed near the order input screen.

However, the checkout apparatus disclosed in JP-A-2008-299821 deletes a menu item, an order of which is cancelled, from the order list and does not keep a history of the menu item. Therefore, with the checkout apparatus disclosed in JP-A-2008-299821, it is difficult to see, for example, during checkout for payment, whether an order is cancelled. This makes operability extremely low for the operator, resulting in a burden on the operator.

SUMMARY

According to an aspect of the present invention, there is provided an order receiving apparatus including: a display unit configured to display an order input screen including an order list in which order information indicating ordered menu items is list-displayed; a receiving unit configured to receive the order information indicating a menu item, an order of which is to be cancelled, among the pieces of order information list-displayed in the order list; a canceling unit configured to cancel the order of the menu item indicated by the received order information; and a changing unit configured to change display of the order information indicating the menu item, the order of which is cancelled, among the pieces of order information list-displayed in the order list to special display.

According to another aspect of the present invention, there is provided an order receiving method including: displaying an order input screen including an order list in which order information indicating ordered menu items is list-displayed; receiving the order information indicating a menu item, an order of which is to be cancelled, among the pieces of order information list-displayed in the order list; canceling the order of the menu item indicated by the received order information; and changing display of the order information indicating the menu item, the order of which is cancelled, among the pieces of order information list-displayed in the order list to special display.

DESCRIPTION OF THE DRAWINGS

FIG. 4 is a schematic diagram of a file structure of a PLU file accessible by the information terminal and the station;

FIG. 8 is a flowchart for explaining a flow of processing for canceling an order.

DETAILED DESCRIPTION

An embodiment of the present invention is explained below with reference to FIGS. 1 to 8. This embodiment is an example in which an order receiving apparatus and an order receiving method are applied to an information terminal of a customer service supporting system for supporting customer service jobs in an overall flow of customer services for guiding a customer who visits a restaurant to a table set in a customer service floor, taking an order, and serving the customer with food. The customer service supporting system according to this embodiment includes information terminals set in the customer service floor and a checkout counter and a station as a server set in a backyard or the like of the restaurant and configured to control the overall customer service supporting system.

Figure 1:
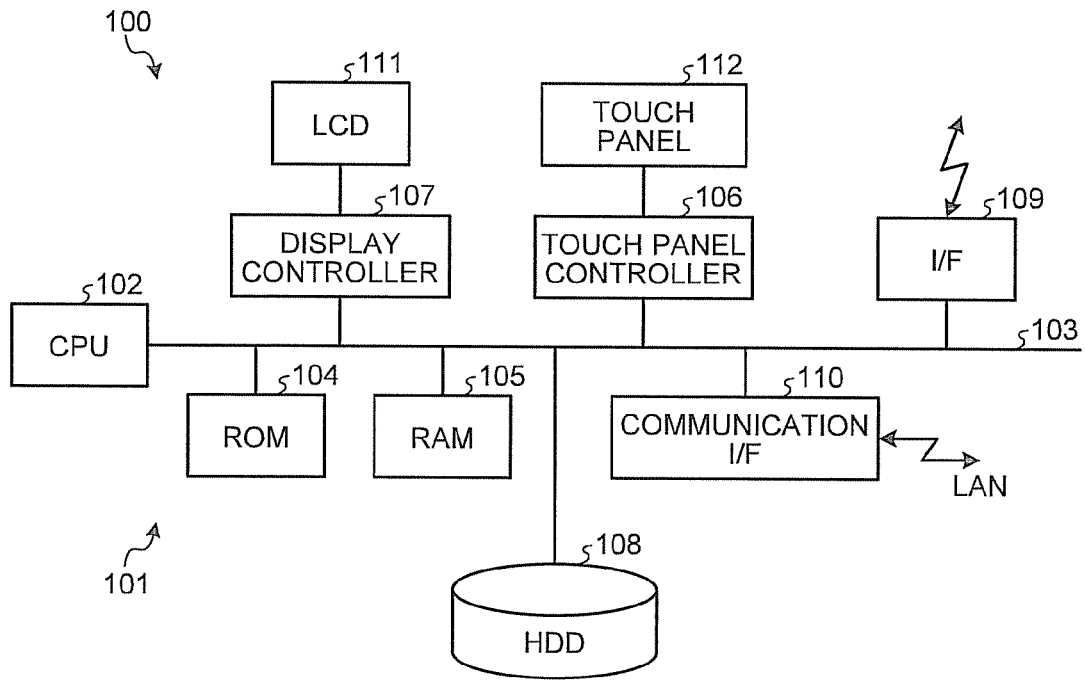
FIG. 1 is a block diagram of electric connection of an information terminal.

FIG. 1 is a block diagram of electric connection of an information terminal. As shown in FIG. 1, an information terminal 100 includes a microcomputer 101. The microcomputer 101 controls to drive units of the information terminal 100. In the microcomputer 101, a read only memory (ROM) 104 having stored therein fixed information such as a control program in advance and a random access memory (RAM) 105 configured to rewritably store various kinds of information and function as a work area or the like are connected, via a bus line 103, to a central processing unit (CPU) 102 configured to centrally control the units. Therefore, the microcomputer 101 configures an information processing unit configured to execute information processing.

In the information terminal 100, a touch panel controller 106, a display controller 107, a hard disk drive (HDD) 108, an interface 109, and a communication interface 110 are connected to the microcomputer 101 via the bus line 103. The touch panel controller 106 captures an input signal from a touch panel 112 into the microcomputer 101. The display controller 107 controls to drive a liquid crystal display (LCD) 111 on the basis of image data to display an image corresponding to image data on the liquid crystal display 111. The interface 109 is an interface such as a universal serial bus (USB) for connecting a printer, a customer side display device, and the like, which are not shown in the figure, to the microcomputer 101. The communication interface 110 is an interface for causing the microcomputer 101 to perform data communication with other apparatuses via a local area network (LAN).

In the information terminal 100, an operating system (OS), a computer program, various files, and the like are installed in the HDD 108. When the information terminal 100 is started, the microcomputer 101 copies all or a part of the OS, the computer program, the various files, and the like installed in the HDD 108 to the RAM 105. The CPU 102 accesses the various files and the like copied to the RAM 105. The CPU 102 operates according to the OS and the computer program copied to the RAM 105.

Figure 2:
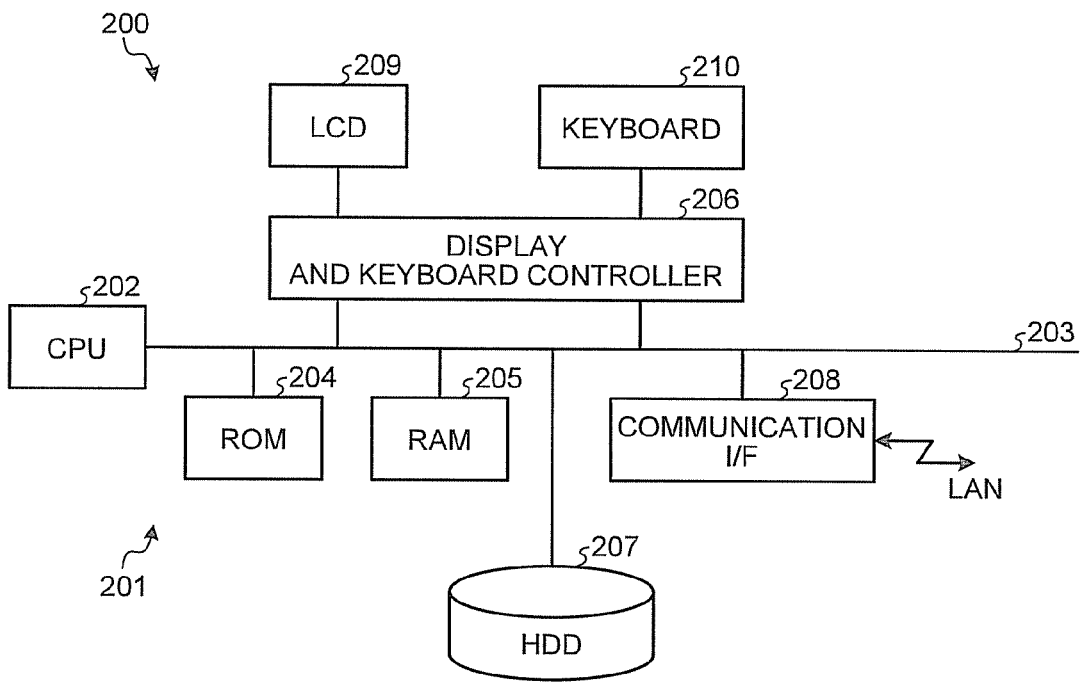
FIG. 2 is a block diagram of electric connection of a station.

FIG. 2 is a block diagram of electric connection of a station. As shown in FIG. 2, a station 200 includes a microcomputer 201. The microcomputer 201 controls to drive units of the station 200. In the microcomputer 201, a ROM 204 having stored therein fixed information such as a control program in advance and a RAM 205 configured to rewritably store various kinds of information and function as a work area or the like are connected, via a bus line 203, to a CPU 202 configured to centrally control the units. Therefore, the microcomputer 201 configures an information processing unit configured to execute information processing.

In the station 200, a display and keyboard controller 206, a HDD 207, and a communication interface 208 are connected to the microcomputer 201 via the bus line 203. The display and keyboard controller 206 controls to drive a liquid crystal display (LCD) 209 on the basis of image data to display an image corresponding to the image data on the liquid crystal display 209. The display and keyboard controller 206 captures an input signal from a keyboard 210 into the microcomputer 201. The communication interface 208 is an interface for causing the microcomputer 201 to perform data communication with other apparatuses through the LAN.

In the station 200, an OS, a computer program, various files, and the like are installed in the HDD 207. The microcomputer 201 copies, when the station 200 is started, all or a part of the OS, the computer program, the various files, and the like installed in the HDD 207 to the RAM 205. The CPU 202 operates according to the OS and the computer program copied to the RAM 205.

Figure 3:
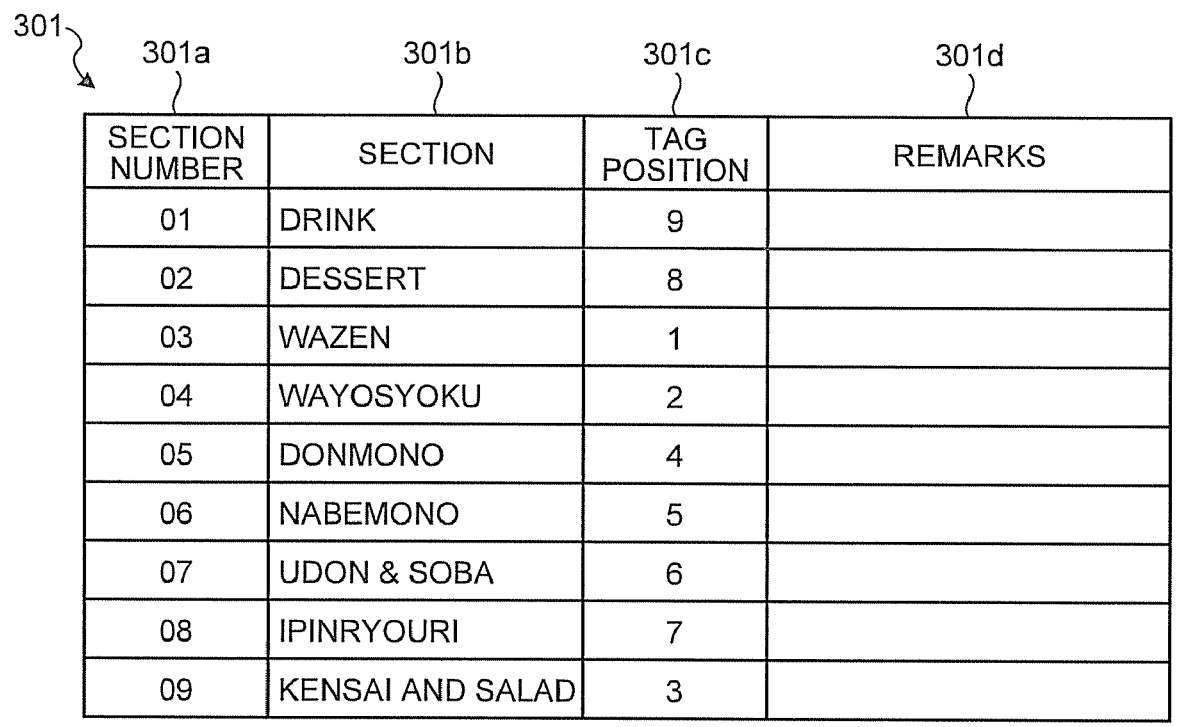
FIG. 3 is a schematic diagram of a file structure of a section file accessible by the information terminal and the station.

FIG. 3 is a schematic diagram of a file structure of a section file accessible by the information terminal and the station. In the information terminal 100 and the station 200, a section file 301 is installed in the HDD 108 of the information terminal 100 and the HDD 207 of the station 200. The station 200 downloads the section file 301 installed in the HDD 207 of the station 200 to the HDD 108 of the information terminal 100, for example, during update of the section file 301 or at night after the closing time such that a discrepancy does not occur between the section file 301 installed in the HDD 108 and the section file 301 installed in the HDD 207.

In the section file 301, a section 301b, a tag position 301c, and remarks 301d are registered in association with a two-digit section number 301a. In the section file 301, for example, as the section number 301a, the following numbers are associated with sections:

01: drink
02: dessert
03: wazen
04: wayosyoku
05: donmono
06: nabemono
07: udon and soba
08: ipinryouri
09: kensai and salad In the section file 301, section names of sections registered in the section number 301a are registered in the section 301b. In the section file 301, the allocation of sections corresponding to a section tag D11 (see FIG. 7) displayed on an order input screen D is registered in the tag position 301c. The remarks 301d column is a column in which various kinds of information can be written for, for example, information management.

FIG. 4 is a schematic diagram of a file structure of a PLU file accessible by the information terminal and the station. In the information terminal 100 and the station 200, a price look up (PLU) file 401 is installed in the HDD 108 of the information terminal 100 and the HDD 207 of the station 200. The station 200 downloads the PLU file 401 installed in the HDD 207 of the station 200 to the HDD 108 of the information terminal 100, for example, during update of the PLU file 401 or at night after the closing time such that a discrepancy does not occur between the PLU file 401 installed in the HDD 108 and the PLU file 401 installed in the HDD 207.

In the PLU file 401, a section 401b, an image link 401c, a menu name 401d, a unit price 401e, allocation 401f, and the like are registered in association with a code 401a represented by a four-digit number. The section 401b represents sections registered in the section 301b in the section file 301. The image link 401c represents link to image data displayed on menu buttons D12a (see FIG. 7) in a menu item space D12. In the information terminal 100 and the station 200, the image data displayed on the menu buttons D12a (see FIG. 7) is installed in the HDD 108 of the information terminal 100 and the HDD 207 of the station 200. In the PLU file 402, item names of menu items are registered in the menu name 401d. In the PLU file 402, unit prices of the menu items are registered in the unit price 401e. In the PLU file 402, allocation positions of menu buttons D12a (see FIG. 7) in the menu item space D12 for the menu items are registered in the allocation 401f.

For example, as shown in FIGS. 3 and 4, a code "0001" defines a menu name "blended coffee" of a section "drink" and sets a unit price "¥350". A code "0002" defines a menu name "iced coffee" of the section "drink" and sets the unit price "¥350".

Figure 5:
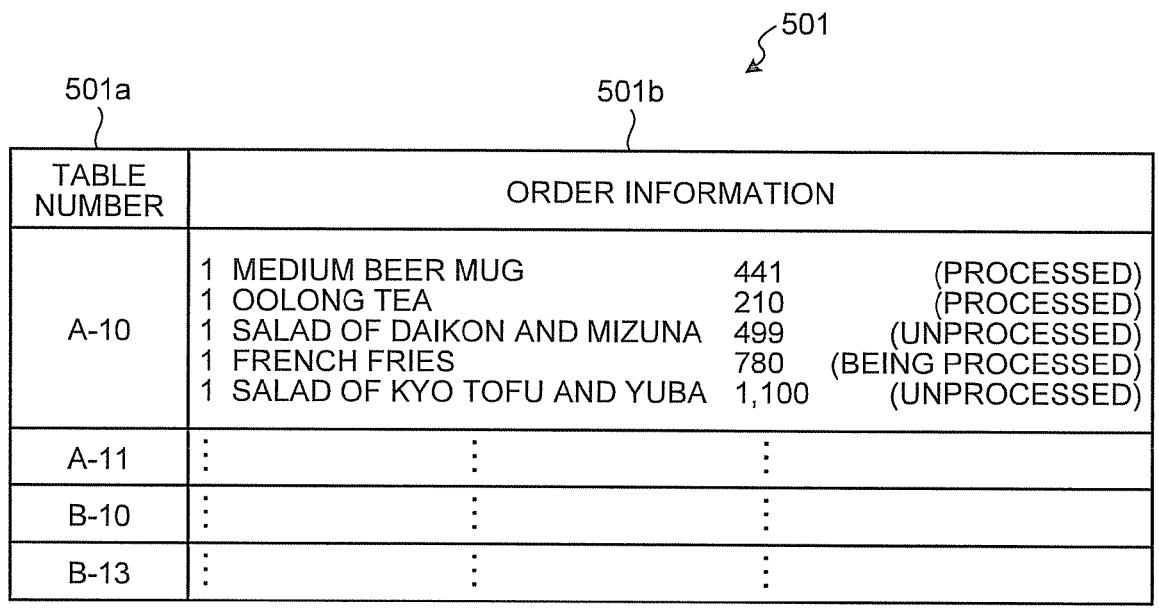
FIG. 5 is a schematic diagram of a file structure of an order information file accumulated in the station.

FIG. 5 is a schematic diagram of a file structure of an order information file accumulated in the station. In an order information file 501, order information 501b and the like are registered in association with a table number 501a represented by one alphabet character and a two-digit number. In the order information file 501, information indicating ordered menu items such as item names of ordered (or cancelled) menu items, numbers representing the numbers of orders and amounts (unit prices x the numbers of orders), and status information representing statuses of the ordered menu items (e.g., information indicating progress states of cooking of the ordered menu items such as unprocessed, being processed, and processed) are registered in the order information 501b.

The station 200 stores, for each of table numbers, order information transmitted from the information terminal 100 through the LAN in the HDD 207 of the station 200. The information terminal 100 transmits the table number 501a to the station 200 during execution of checkout processing or during execution of order cancellation processing. The information terminal 100 downloads order information of a table number for checkout (or cancellation) from the order information file 501 of the HDD 207 of the station 200 to the HDD 108 of the information terminal 100.

In this embodiment, a chef or the like in the kitchen operates the keyboard 210 of the station 200 to thereby update the status information according to a progress state of cooking of ordered menu items.

Characteristic processing of the information terminal 100 according to this embodiment among kinds of processing executed by the microcomputer 101 according to the OS and the computer program installed in the HDD 108 of the information terminal 100 is explained below.

Figure 6:
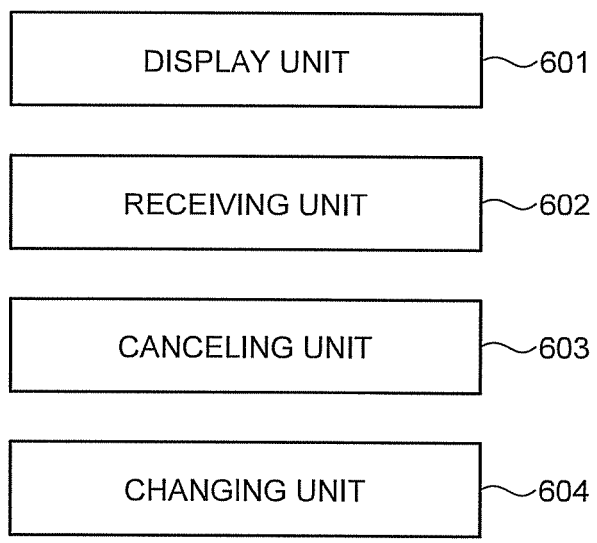
FIG. 6 is a block diagram of a module configuration of an information terminal according to an embodiment of the present invention.

The computer program executed by the information terminal 100 according to this embodiment has a module configuration including units (a display unit 601, a receiving unit 602, a canceling unit 603, and a changing unit 604) shown in FIG. 6. As actual hardware, the CPU 102 of the microcomputer 101 reads out the computer program from the HDD 108 and executes the computer program, whereby the units are loaded onto the RAM 105 and the display unit 601, the receiving unit 602, the canceling unit 603, and the changing unit 604 are generated on the RAM 105. FIG. 6 is a block diagram of a module configuration of the information terminal according to this embodiment.

Figure 7:
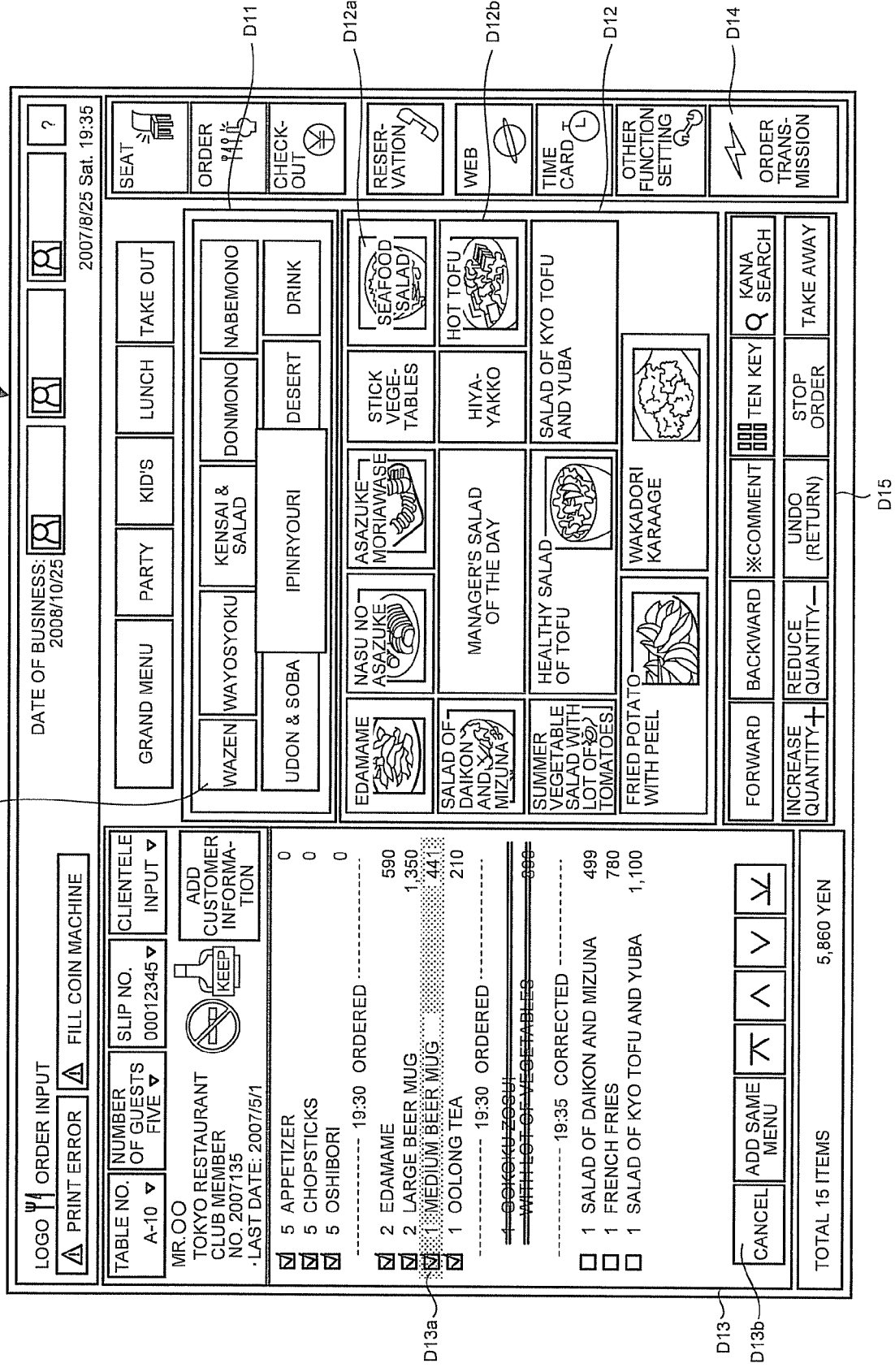
FIG. 7 is a diagram of an example of an order input screen.

The display unit 601 displays an order input screen D shown in FIG. 7 on the liquid crystal display 111. FIG. 7 is a diagram of an example of an order input screen. The display unit 601 displays the order input screen D including the section tag D11, the menu item space D12, an order list D13, a job designation key D14, and a function key D15.

The display unit 601 displays section buttons D11a, on which section names registered in the section 301b in association with the section number 301a of the section file 301 are displayed, in the section tag D11 as objects that can be touch-designated on the touch panel 112.

In an initial state, the display unit 601 displays the menu buttons D12a, on which the image data of the link destinations represented by the image link 401c and the item names registered in the menu name 401d in association with the code 401a of the PLU file 401 are displayed, in the menu item space D12 as objects that can be touch-designated on the touch panel 112.

The display unit 601 displays keys for designating execution of various jobs such as "checkout" related to execution of checkout processing and "order transmission" related to execution of order transmission on the job designation key D14 as objects that can be touch-designated on the touch panel 112.

The display unit 601 list-displays, as objects that can be touch-designated on the touch panel 112, in the order list D13, order information of menu items ordered by touch designation on the menu button D12a on the touch panel 112. In this embodiment, the display unit 601 list-displays, in the order list D13, order information downloaded from the station 200 to the HDD 108.

The display unit 601 displays the order list D13 in which the order information of the ordered menu items is arranged in the order of orders. Further, the display unit 601 displays, under the order information transmitted to the station 200 by touch designation on the job designation key ("order transmission") D14, indication that the menu items are ordered and time of transmission of the order information to the station 200.

Further, the display unit 601 displays a focus D13a in a row of the touch-designated order information. The display unit 601 displays, in the order list D13, a cancellation button D13b for instructing cancellation of an order of a menu item indicated by the order information in the row on which the focus D13a is set. The display unit 601 displays the order list D13 with the cancellation button D13b set as an object that can be touch-designated on the touch panel 112.

The display unit 601 displays the job designation key D14 on which keys for designating execution of various jobs such as "checkout" related to execution of checkout processing and "order transmission" related to execution of transmission of the order information are displayed as objects that can be touch-designated on the touch panel 112.

The display unit 601 displays the function key D15 on which keys for designating execution of various functions such as "increase quantity" related to execution of processing for increasing the number of orders and "reduce quantity" related to execution of processing for reducing the number of orders are displayed as objects that can be touch-designated on the touch panel 112.

A user can select, in inputting a menu item, a desired section out of "drink", "dessert", "wazen", "wayosyoku", "donmono", "nabemono", "udon & soba", "ipinryouri", and "kensai and salad" by touch-designating a desired section button D11a of the section tag D11 on such an order input screen D. For example, the display unit 601 displays the order input screen D for "ipinryouri" illustrated in FIG. 7 when the section button D11a of "ipinryouri" in the section tag D11 is touch-designated.

The receiving unit 602 receives, as the order information of a menu item, an order of which is to be cancelled, the order information displayed in the row on which the focus D13a is set by touch designation and for which the cancellation button D13b is touch designated.

In this embodiment, the receiving unit 602 receives, among the pieces of order information list-displayed in the order list D13, only order information before transmission to the station 200 that is order information for which indication that a menu item is ordered is not displayed. Alternatively, the receiving unit 602 may receive, among the pieces of order information list-displayed in the order list D13, only order information for which the status information included in the order information downloaded from the station 200 to the HDD 108 is unprocessed. Consequently, it is possible to prevent, after the chef in the kitchen starts cooking of an ordered menu item, the order of the menu item from being cancelled.

The canceling unit 603 transmits order information received by the receiving unit 602, in which an item name, numbers representing the number of orders and an amount, and status information of a cancelled menu item is registered, to the station 200 to thereby cancel the order of the menu items indicated by the order information received by the receiving unit 602.

The changing unit 604 changes, among the pieces of order information list-displayed in the order list D13, display of the order information indicating the menu item, the order of which is cancelled by the canceling unit 603, to display with a double line drawn on the item name, the numbers representing the number of orders and the amount, and the status information of the menu item included in the order information 501b.

In this embodiment, the changing unit 604 changes the display of the order information indicating the menu item, the order of which is cancelled, to the display with the double line drawn on the item name, the numbers representing the number of orders and the amount, and the status information of the menu item included in the order information. However, the display is not limited to this as long as the display of the order information indicating the menu item, the order of which is cancelled, is changed to special display. For example, the changing unit 604 may change the display of the order information indicating the menu item, the order of which is cancelled, to display of a color different from that of the order information list-displayed in the order list D13. The changing unit 604 may change the display of the order information indicating the menu item, the order of which is cancelled, to the special display and display cancellation time of the order in a row in which the order information is displayed.

Processing for canceling an order is explained below with reference to FIG. 8. FIG. 8 is a flowchart for explaining a flow of the processing for canceling an order. As shown in FIG. 8, in the processing for canceling an order, the receiving unit 602 waits for touch designation of order information in the order list D13 of the order input screen D and selection of order information of a menu item, an order of which is to be cancelled, by touch designation of the cancellation button D13*b* (No in Act 801). If it is determined that order information indicating a menu item, an order of which is to be cancelled, is selected (Yes in Act 801), the receiving unit 602 receives the selected order information as order information indicating a menu item, an order of which is to be cancelled (Act 802).

Subsequently, the canceling unit 603 transmits the order information received by the receiving unit 602 to the station 200 as order information indicating a menu item, an order of which is cancelled, and cancels the order of the menu item indicated by the order information received by the receiving unit 602 (Act 803). Subsequently, the changing unit 604 changes, among the pieces of order information list-displayed in the order list D13, display of the order information indicating the menu item, the order of which is cancelled by the canceling unit 603, to display with a double line drawn on an item name, numbers representing the number of orders and an amount, and status information of the menu item included in the order information (Act 804).

As explained above, according to this embodiment, among the pieces of order information list-displayed in the order list D13 of the order input screen D, the display of the order information indicating the menu item, the order of which is cancelled, is changed to the special display. This makes it easy to see an order of a menu item indicated by which order information among the pieces of order information list-displayed in the order list D13 is cancelled. Therefore, convenience for the operator is high and a burden on the operator can be reduced. When the order is cancelled, indication that the order is cancelled is not added to the order list D13. Therefore, it is possible to prevent unnecessary rows from increasing in the order list D13.

Further effects and modifications can be easily derived by those skilled in the art. Therefore, a wider aspect of the present invention is not limited by the specific details and the representative embodiment represented and described above. Therefore, various modifications are possible without departing from the spirit or the scope of the general concept of the invention defined by the appended claims and their equivalents.

What is claimed is:

1. An order receiving apparatus comprising:
a transmitter unit configured to transmit order information indicating a menu item ordered to a station which is configured to store the order informationp;
a display unit configured to display an order input screen including a menu button and an order list, the menu button being able to be touch-designated with a touch panel, the menu button displaying information indicating a menu item, the ordered list list-displaying first order information and second order information, the first order information indicating a menu item and being input with the menu button but not yet being transmitted to the station by the transmitter unit, the second order information indicating a menu item ordered and being transmitted previously to the station by the transmitter unit,
a receiving unit configured to receive an instruction of canceling the order of the ordered menu item indicated by the first order information list-displayed in the order list;
a canceling unit configured to cancel the order of the ordered menu item indicated by the first order information in accordance with the received instruction; and
a controller configured to control the display unit to change a display form of the menu item, the order of which is cancelled, in the order list to a different display form from a display form of a menu items, an order of which is not cancelled in the order list.

2. The apparatus according to claim 1, wherein the controller further controls the display unit to display cancellation time of the order in a row in which the menu item, the order of which is cancelled is displayed in the different form in the order list.

3. The apparatus according to claim 1, wherein the receiving unit receives, among the first order information and the second order information list-displayed in the order list, only the first order information before transmission to the station.

4. The apparatus according to claim 1, wherein the receiving unit receives, among the first order information and the second order information list-displayed in the order list, only the first order information indicating a menu item of an unprocessed order.

5. The apparatus according to claim 1, wherein the different display form includes a double line drawn on the menu item, the order of which is cancelled.

6. The apparatus according to claim 1, wherein in the different display form, a color of the menu item, the order of which is cancelled is, different from that of the menu item, the order of which is not cancelled.

7. The apparatus according to claim 1, wherein
the order input screen including a cancellation button for instructing cancellation of the order of the ordered menu item, and
the canceling unit cancels the order of the ordered menu item, the cancellation of which is instructed with the cancellation button.

8. The apparatus according to claim 1, wherein the order input screen includes the order list in which the menu items indicated by the first order information and the second order information are list-displayed in order of orders.

9. An order receiving method comprising:
transmitting order information indicating a menu item ordered to a station which is configured to store the order information;
displaying an order input screen including a menu button and an order list, the menu button being able to be touch-designated with a touch panel, the menu button displaying information indicating a menu item, the order list list-displaying first order information and second order information, the first order information indicating a menu item ordered and being input with the menu button but not yet being transmitted to the station, the second order information indicating a menu item ordered and being transmitted previously to the station;

receiving an instruction of cancelling the order of the ordered menu item indicated by the first order information list-displayed in the order list;

canceling the order of the ordered menu item indicated by the first order information in accordance with the received instruction; and changing a display form of the menu item, the order of which is cancelled, in the order list to a different display form from a display form of a menu item, an order of which is not cancelled in the order list.

10. The method according to claim 9, wherein in the different display form cancellation time of the order is displayed in a row in which the menu item, the order of which is cancelled is displayed in the order list.

* * * * *